United States Patent
Ahn et al.

(10) Patent No.: US 10,700,379 B2
(45) Date of Patent: Jun. 30, 2020

(54) POLYMER ELECTROLYTE AND LITHIUM SECONDARY BATTERY INCLUDING THE SAME

(71) Applicant: LG Chem, Ltd., Seoul (KR)

(72) Inventors: Kyoung Ho Ahn, Daejeon (KR); Sol Ji Park, Daejeon (KR); Jung Hoon Lee, Daejeon (KR); Chul Haeng Lee, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 16/080,094

(22) PCT Filed: Sep. 1, 2017

(86) PCT No.: PCT/KR2017/009621
§ 371 (c)(1),
(2) Date: Aug. 27, 2018

(87) PCT Pub. No.: WO2018/044128
PCT Pub. Date: Mar. 8, 2018

(65) Prior Publication Data
US 2019/0058217 A1    Feb. 21, 2019

(30) Foreign Application Priority Data

Sep. 2, 2016 (KR) .......... 10-2016-0113354
Sep. 1, 2017 (KR) .......... 10-2017-0112015

(51) Int. Cl.
*H01M 10/0565* (2010.01)
*C08J 5/22* (2006.01)
(Continued)

(52) U.S. Cl.
CPC .... *H01M 10/0565* (2013.01); *C08G 65/3322* (2013.01); *C08J 5/22* (2013.01);
(Continued)

(58) Field of Classification Search
CPC .................................................. H01M 10/0565
See application file for complete search history.

(56) References Cited

U.S. PATENT DOCUMENTS

| 2015/0288028 A1 | 10/2015 | DeSimone et al. |
| 2016/0043435 A1 | 2/2016 | DeSimone |
| 2017/0229735 A1* | 8/2017 | Ahn ............... H01M 10/0565 |

FOREIGN PATENT DOCUMENTS

| JP | H11116792 A | 4/1999 |
| KR | 20150138497 | * 12/2015 |

(Continued)

OTHER PUBLICATIONS

Extended European Search Report including Written Opinion for Application No. EP17847053.0 dated Feb. 19, 2019.
(Continued)

*Primary Examiner* — Ula C Ruddock
*Assistant Examiner* — Thomas H. Parsons
(74) *Attorney, Agent, or Firm* — Lerner, David, Littenberg, Krumholz & Mentlik, LLP

(57) ABSTRACT

The present invention relates to a polymer electrolyte, which includes a lithium salt and a copolymer including a fluorine-substituted or unsubstituted polyalkylene ether repeating unit, and a lithium secondary battery including the same.

14 Claims, 3 Drawing Sheets

(51) Int. Cl.
    *C08G 65/332* (2006.01)
    *H01M 10/056* (2010.01)
    *C08L 71/02* (2006.01)
    *H01M 2/16* (2006.01)
    *H01M 10/0525* (2010.01)
    *C08G 65/00* (2006.01)
    *C08K 3/22* (2006.01)
    *H01M 10/052* (2010.01)

(52) U.S. Cl.
    CPC .............. *C08L 71/02* (2013.01); *H01M 2/16* (2013.01); *H01M 10/056* (2013.01); *C08G 65/007* (2013.01); *C08K 2003/2203* (2013.01); *H01M 2/1653* (2013.01); *H01M 10/052* (2013.01); *H01M 10/0525* (2013.01); *H01M 2300/0068* (2013.01); *H01M 2300/0071* (2013.01); *H01M 2300/0082* (2013.01); *H01M 2300/0091* (2013.01)

(56) References Cited

FOREIGN PATENT DOCUMENTS

| KR | 20150138497 A | * | 12/2015 |
| KR | 20150139827 A | | 12/2015 |
| KR | 20160040127 A | | 4/2016 |
| WO | 2016161465 A1 | | 10/2016 |

OTHER PUBLICATIONS

Rollad, Jason P., "Solvent-Resistant Photocurable "Liquid Teflon" for Microfluidic Device Fabrication", Journal of the American Chemical Society, Mar. 1, 2004, vol. 126, No. 8, pp. 2322-2323, XP055548594.

International Search Report for Application No. PCT/KR2017/009621 dated Dec. 19, 2017.

Olson, K.R. et al., "Liquid Perfluoropolyether Electrolytes with Enhanced Ionic Conductivity for Lithium Battery Applications", Polymer, Aug. 8, 2016, vol. 100, pp. 126-133.

Villaluenga, I. et al., "Compliant Glass-polymer Hybrid Single Ion-conducting Electrolytes for Lithium Batteries", Proceedings of the National Academy of Sciences, Jan. 5, 2016, vol. 113, No. 1, pp. 52-57.

Wong, D.H.C. et al., "Nonflammable Perfluoropolyether-based Electrolytes for Lithium Batteries", Proceedings of the National Academy of Sciences, Mar. 4, 2014, vol. 111, No. 9, pp. 3327-3331.

Wong, D.H.C. et al., Phase behavior and Electrochemical Characterization of Blends of Perfluoropolyether, Poly (ethylene glycol), and Lithium Salt, Chemistry of Materials, Dec. 20, 2014, vol. 27, pp. 597-603.

Wong, H.C. et al., Thesis "Perfluoropolyether-Based Electrolytes for Lithium Battery Applications", 2015, Department of Chemistry, University of North Carolina at Chapel Hill, internal pp. 1-160.

* cited by examiner

POLYMER ELECTROLYTE AND LITHIUM SECONDARY BATTERY INCLUDING THE SAME

CROSS-REFERENCE TO RELATED APPLICATIONS

The present application is a national phase entry under 35 U.S.C. § 371 of International Application No. PCT/KR2017/009621, filed on Sep. 1, 2017, which claims the benefit of Korean Patent Application Nos. 2016-113354, filed on Sep. 2, 2016, and 2017-0112015, filed on Sep. 1, 2017, the disclosures of which are incorporated herein by reference.

TECHNICAL FIELD

The present invention relates to a polymer electrolyte having improved ionic conductivity and a lithium secondary battery including the same.

BACKGROUND ART

Efforts for research and development of batteries have been gradually materialized while the application of energy storage technologies is expanded to mobile phones, camcorders, notebook PCs, and electric vehicles, and electrochemical devices have received most attention in this respect.

Particularly, in line with the recent trends of electronic devices, efforts to develop lithium secondary batteries having small size and lightweight characteristics and capable of being charged and discharged to high capacity have continued.

A lithium secondary battery is composed of a positive electrode and a negative electrode, which include electrode active materials capable of intercalating/deintercalating lithium ions, a separator disposed therebetween, and an electrolyte as a lithium ion transfer medium.

The electrolyte currently used is a liquid electrolyte in which a lithium salt is dissolved in an organic solvent, wherein, since the electrolyte is at high risk of leakage, fire, and explosion and the growth of dendrites is possible, the electrolyte may cause self-discharge and heating of the lithium battery.

In order to improve the above disadvantages, various studies of a polymer electrolyte having a structure, in which a lithium salt is dissociated or impregnated in a polymer, instead of the liquid electrolyte, have recently been attempted.

Since the polymer electrolyte is not at risk of ignition in comparison to a case where the liquid electrolyte is used, it is known that the polymer electrolyte is suitable for a lithium secondary battery for an electric vehicle, or a large storage battery.

An electrolyte, which includes polyethylene oxide or polyether having ion dissociation ability in a main chain, has mainly been proposed as the polymer electrolyte. However, the polymer electrolyte has disadvantageous in that it has low ionic conductivity at room temperature and low temperature and has an oxidation stability of 4.0 V or less. Also, in a case in which the polymer electrolyte is composited with other conductive materials and used, it is disadvantageous in that lithium (Li) ion transfer numbers are different from each other to cause non-uniform ion transport on the surface of the electrode.

Thus, there emerges a need to develop a polymer electrolyte with a new configuration which may simultaneously improve mechanical properties and ionic conductivity while reducing interfacial resistance.

PRIOR ART DOCUMENT

Nitash P. Balsara, Chemistry of Materials, 2015, 27 (2), 597-603.

DISCLOSURE OF THE INVENTION

Technical Problem

An aspect of the present invention provides a polymer electrolyte having improved ionic conductivity.

Another aspect of the present invention provides a lithium secondary battery in which electrochemical stability and life characteristics are improved by including the polymer electrolyte of the present invention.

Technical Solution

According to an aspect of the present invention, there is provided a polymer electrolyte including a lithium salt; and a copolymer represented by Formula 1:

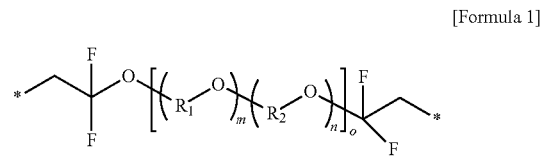

[Formula 1]

wherein, in Formula 1, $R_1$ and $R_2$ are each independently a fluorine-substituted or unsubstituted alkylene group having 1 to 4 carbon atoms, each of m, n, and o is the number of repeating units, m is an integer of 1 to 10, n is an integer of 1 to 10, and o is an integer of 1 to 500.

A weight ratio of the copolymer represented by Formula 1 to the lithium salt may be in a range of 7:3 to 9.5:0.5.

Also, the copolymer represented by Formula 1 may include at least one selected from the group consisting of compounds represented by Formulae 1a to 1c:

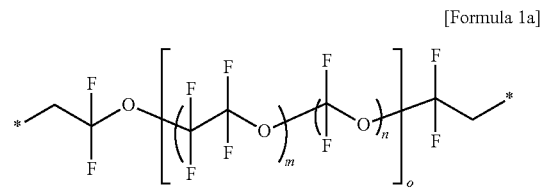

[Formula 1a]

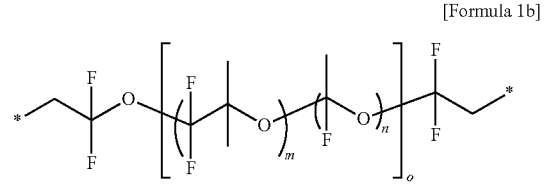

[Formula 1b]

[Formula 1c]

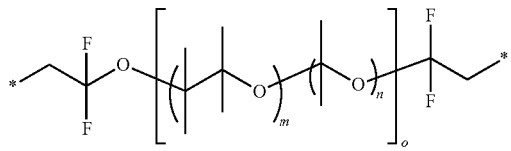

wherein, in Formulae 1a to 1c,
each of m, n, and o is the number of repeating units,
m is an integer of 1 to 10,
n is an integer of 1 to 10, and
o is an integer of 1 to 500.

Specifically, the copolymer represented by Formula 1 may include a copolymer represented by Formula 2:

[Formula 2]

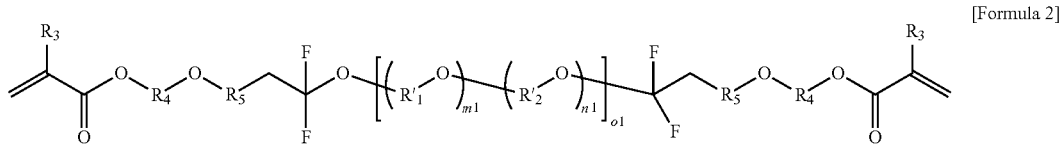

wherein, in Formula 2,
$R'_1$ and $R'_2$ are each independently a fluorine-substituted or unsubstituted alkylene group having 1 to 4 carbon atoms,
$R_3$ is hydrogen, or an alkyl group having 1 to 6 carbon atoms,
$R_4$ is an alkylene group having 1 to 6 carbon atoms,
$R_5$ is an alkylene group having 1 to 5 carbon atoms, or —CO—NH—$R_6$—NH—CO—O—,
$R_6$ is an aliphatic, alicyclic, or aromatic hydrocarbon group,
each of m1, n1, and o1 is the number of repeating units,
m1 is an integer of 1 to 10,
n1 is an integer of 1 to 10, and
o1 is an integer of 1 to 500.

In this case, the aliphatic hydrocarbon group may include an alkylene group having 1 to 20 carbon atoms; an alkylene group having 1 to 20 carbon atoms which contains an isocyanate group (NCO); an alkoxylene group having 1 to 20 carbon atoms; an alkenylene group having 2 to 20 carbon atoms; or an alkynylene group having 2 to 20 carbon atoms, the alicyclic hydrocarbon group may include a substituted or unsubstituted cycloalkylene group having 4 to 20 carbon atoms; a substituted or unsubstituted cycloalkylene group having 4 to 20 carbon atoms which contains an isocyanate group (NCO); a cycloalkenylene group having 4 to 20 carbon atoms; or a heterocycloalkylene group having 2 to 20 carbon atoms, and the aromatic hydrocarbon group may include a substituted or unsubstituted arylene group having 6 to 20 carbon atoms; or a heteroarylene group having 2 to 20 carbon atoms.

The copolymer represented by Formula 2 may include at least one selected from the group consisting of copolymers represented by Formulae 2a to 2c:

[Formula 2a]

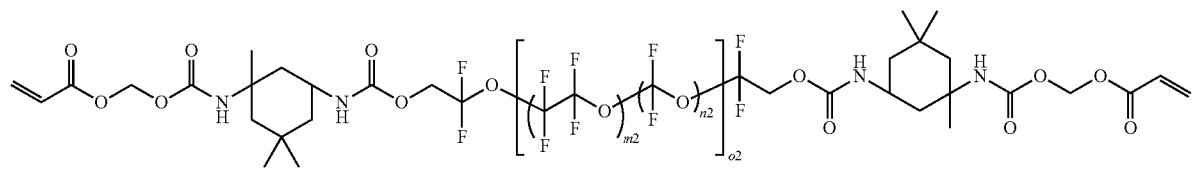

wherein, in Formula 2a,
each of m2, n2, and o2 is the number of repeating units,
m2 is an integer of 1 to 10,
n2 is an integer of 1 to 10, and
o2 is an integer of 1 to 500,

[Formula 2b]

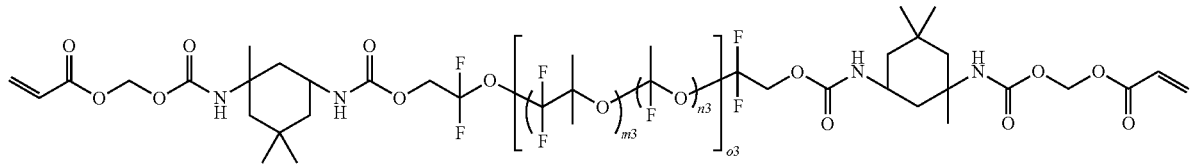

wherein, in Formula 2b,
each of m3, n3, and o3 is the number of repeating units,
m3 is an integer of 1 to 10,
n3 is an integer of 1 to 10, and
o3 is an integer of 1 to 500,

[Formula 2c]

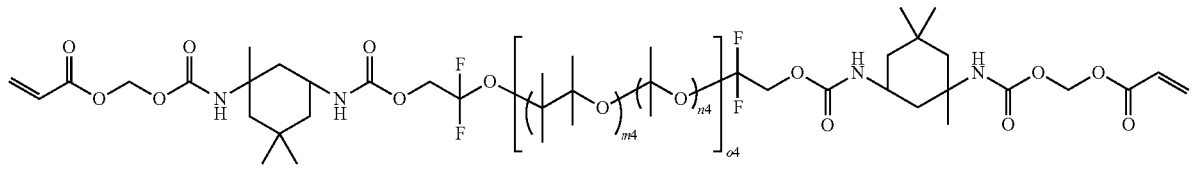

wherein, in Formula 2c,
each of m4, n4, and o4 is the number of repeating units,
m4 is an integer of 1 to 10,
n4 is an integer of 1 to 10, and
o4 is an integer of 1 to 500.

The copolymer represented by Formula 2 may have a weight-average molecular weight (Mw) of 200 g/mol to 100,000 g/mol.

Furthermore, the polymer electrolyte of the present invention may further include a ceramic electrolyte.

The ceramic electrolyte may include a single material selected from the group consisting of a phosphate-based electrolyte selected from the group consisting of lithium phosphate, lithium titanium phosphate, lithium aluminum titanium phosphate, and lithium aluminum germanium phosphate; a sulfide-based electrolyte selected from the group consisting of $SiS_2(Li_xSi_yS_z)$-based glass, $P_2S_5(Li_xP_yS_z)$-based glass, lithium germanium thiophosphate, and lithium phosphorus sulfide-based glass; lithium lanthanum titanate; lithium nitride; lithium lanthanum zirconate; and tantalum pentoxide, or a mixture of two or more thereof.

In this case, a weight ratio of the copolymer represented by Formula 2 to the ceramic electrolyte may be in a range of 1:0.1 to 1:9.

Also, the polymer electrolyte of the present invention may further include inorganic particles.

The inorganic particles may include a single material selected from the group consisting of $Al_2O_3$, $BaTiO_3$, $SnO_2$, $CeO_2$, $SiO_2$, $TiO_2$, $Li_3PO_4$, $NiO$, $ZnO$, $MgO$, $Mg(OH)_2$, $CaO$, $ZrO_2$, $Y_2O_3$, $Pb(Zr, Ti)O_3$, $Pb_{1-x}La_xZr_{1-y}Ti_yO_3$ (PLZT, where, $0<x<1$ and $0<y<1$), $PB(Mg_3Nb_{2/3})O_3$—$PbTiO_3$, and hafnia, or a mixture of two or more thereof.

In this case, a weight ratio of the copolymer represented by Formula 2 to the inorganic particles may be in a range of 1:0.1 to 1:7.0.

Furthermore, the polymer electrolyte of the present invention may further include a plasticizer.

The plasticizer may include at least one compound of a carbonate-based compound, a lactone-based compound, an alkyl ether-based compound, an alkyl acetate-based compound, and an alkyl propionate-based compound, and, in this case, a weight ratio of the copolymer represented by Formula 2 to the plasticizer may be in a range of 1:0.1 to 1:0.5.

According to another aspect of the present invention, there is provided a lithium secondary battery including a positive electrode, a negative electrode, and a polymer electrolyte formed on at least one surface of the positive electrode and the negative electrode, wherein the polymer electrolyte includes the polymer electrolyte of the present invention.

The polymer electrolyte may be disposed on at least one surface of the positive electrode and the negative electrode.

Also, the lithium secondary battery may include a separator, and, in this case, the polymer electrolyte may be disposed on at least one surface of the positive electrode, the negative electrode, and the separator.

Advantageous Effects

In the present invention, a polymer electrolyte, in which high ionic conductivity is achieved by including a copolymer that includes a fluorine-substituted or unsubstituted polyalkylene ether repeating unit, may be prepared, and furthermore, a lithium secondary battery having improved electrochemical stability and life characteristics may be prepared by including the same.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

Figure 1:
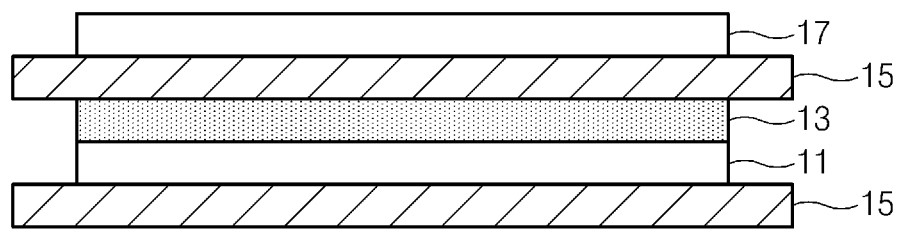
FIGS. 1 through 3 schematically illustrate examples of various configurations of secondary batteries including a polymer electrolyte according to an embodiment of the present invention.

DESCRIPTION OF THE SYMBOLS 11, 21, 31: Negative electrode
13, 23, 33: Polymer electrolyte
15, 25: Separator
17, 27, 37: Positive electrode

MODE FOR CARRYING OUT THE INVENTION

Hereinafter, the present invention will be described in more detail to allow for a clearer understanding of the present invention. In this case, it will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

In the specification of the present invention, the expression "repeating unit" denotes a unit derived from a monomer formed by polymerization of the monomer. The repeating unit may be a unit directly formed by a polymerization reaction, or may be a unit having a part of the unit converted to another structure by treating the polymer.

Also, unless otherwise specified in the present invention, the expression "*" denotes the same or different atom or a portion connected between ends of a formula.

First, in an embodiment of the present invention, provided is a polymer electrolyte including:
a lithium salt; and
a copolymer represented by Formula 1 below.

[Formula 1]

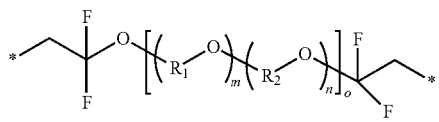

In Formula 1,
$R_1$ and $R_2$ are each independently a fluorine-substituted or unsubstituted alkylene group having 1 to 4 carbon atoms,
each of m, n, and o is the number of repeating units,
m is an integer of 1 to 10,
n is an integer of 1 to 10, and
o is an integer of 1 to 500.

The $R_1$ and $R_2$ may be a fluorine-substituted alkylene group having 1 to 4 carbon atoms.

In this case, in the copolymer represented by Formula 1, each of the n, m, and o denotes the number of repetitions (the number of repeating units), wherein the repeating units n, m, and o may be alternatingly, graftedly, or randomly arranged while having predetermined rules between one another or having no rules.

First, in the polymer electrolyte according to the embodiment of the present invention, the lithium salt is a component included to further improve a lithium cation-transfer effect, wherein, specifically, the lithium salt may include $Li^+$ as a cation, and may include at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $B(C_2O_4)_2^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ as an anion.

For example, the lithium salt may include at least one selected from the group consisting of $LiPF_6$, $LiBF_4$, $LiClO_4$, $LiN(CF_3SO_2)_2$, and $LiN(FSO_2)_2$, and $LiN(CF_3SO_2)_2$.

In order to obtain an optimum effect of forming an anti-corrosion coating layer on the surface of the electrode, the lithium salt may be included in an amount of 5 M or less in the polymer electrolyte, and, for example, the copolymer represented by Formula 1 and the lithium salt may be included in an amount ratio of 7:3 to 9.5:0.5 as a weight ratio. In a case in which the amount ratio of the lithium salt is less than 0.5, since a concentration of lithium (Li) ions is insufficient, resistance may be increased and a non-uniform reaction in a negative electrode may simultaneously occur. If the amount ratio of the lithium salt is greater than 3, since the lithium salt has a concentration above a dissociable concentration, there is a high possibility that the lithium salt precipitates.

Also, in the polymer electrolyte according to the embodiment of the present invention, as a typical example, the copolymer represented by Formula 1 may include copolymers represented by the following Formulae 1a to 1c.

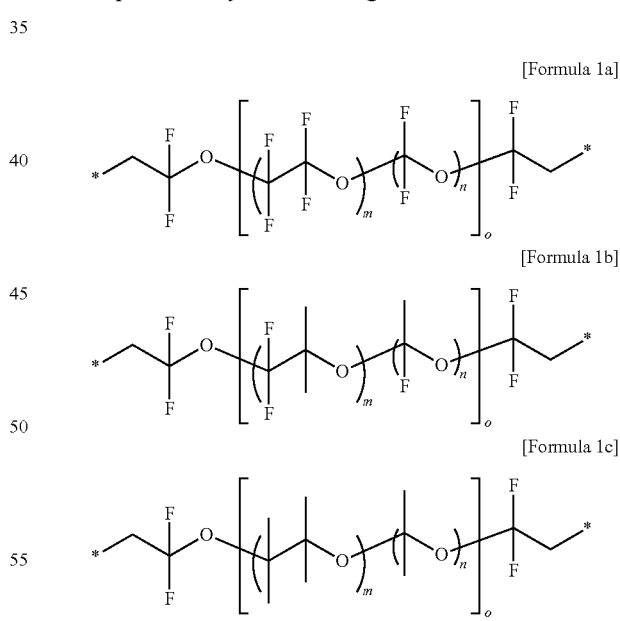

In Formulae 1a to 1c,
each of m, n, and o is the number of repeating units,
m is an integer of 1 to 10,
n is an integer of 1 to 10, and
o is an integer of 1 to 500.

Specifically, the copolymer represented by Formula 1 may include a copolymer represented by the following Formula 2.

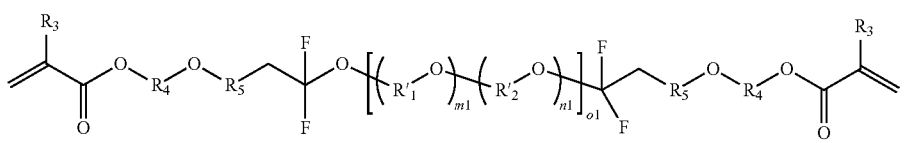

[Formula 2]

In Formula 2, $R'_1$ and $R'_2$ are each independently a fluorine-substituted or unsubstituted alkylene group having 1 to 4 carbon atoms, $R_3$ is hydrogen, or an alkyl group having 1 to 6 carbon atoms, $R_4$ is an alkylene group having 1 to 6 carbon atoms, $R_5$ is an alkylene group having 1 to 5 carbon atoms, or —CO—NH—$R_6$—NH—CO—O—, $R_6$ is an aliphatic, alicyclic, or aromatic hydrocarbon group, each of m1, n1, and o1 is the number of repeating units, m1 is an integer of 1 to 10, n1 is an integer of 1 to 10, and o1 is an integer of 1 to 500.

In this case, the aliphatic hydrocarbon group may include an alkylene group having 1 to 20 carbon atoms; an alkylene group having 1 to 20 carbon atoms which contains an isocyanate group (NCO); an alkoxylene group having 1 to 20 carbon atoms; an alkenylene group having 2 to 20 carbon atoms; or an alkynylene group having 2 to 20 carbon atoms, the alicyclic hydrocarbon group may include a substituted or unsubstituted cycloalkylene group having 4 to 20 carbon atoms; a substituted or unsubstituted cycloalkylene group having 4 to 20 carbon atoms which contains an isocyanate group (NCO); a cycloalkenylene group having 4 to 20 carbon atoms; or a heterocycloalkylene group having 2 to 20 carbon atoms, and the aromatic hydrocarbon group may include a substituted or unsubstituted arylene group having 6 to 20 carbon atoms; or a heteroarylene group having 2 to 20 carbon atoms.

Also, the copolymer represented by Formula 2 may include at least one selected from the group consisting of copolymers represented by the following Formulae 2a to 2c.

[Formula 2a]

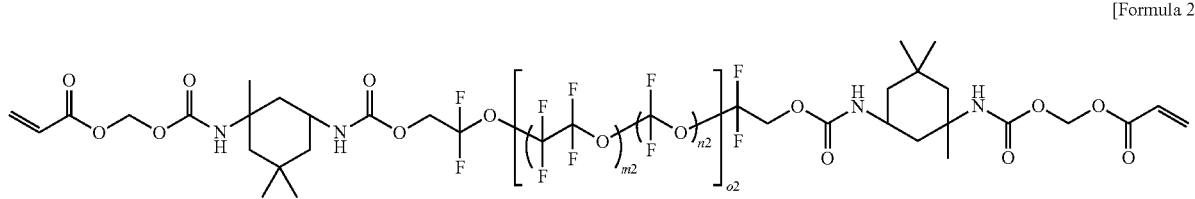

In Formula 2a, each of m2, n2, and o2 is the number of repeating units, m2 is an integer of 1 to 10, n2 is an integer of 1 to 10, and o2 is an integer of 1 to 500.

[Formula 2b]

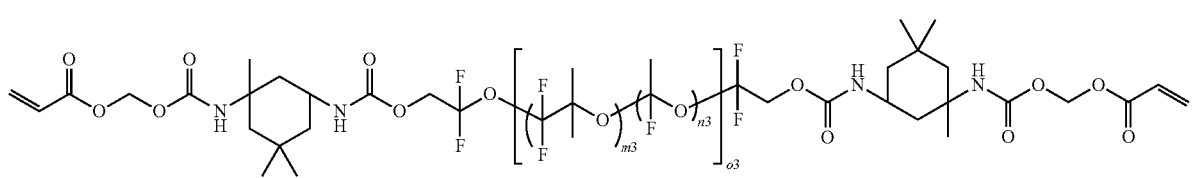

In Formula 2b, each of m3, n3, and o3 is the number of repeating units, m3 is an integer of 1 to 10, n3 is an integer of 1 to 10, and o3 is an integer of 1 to 500.

[Formula 2c]

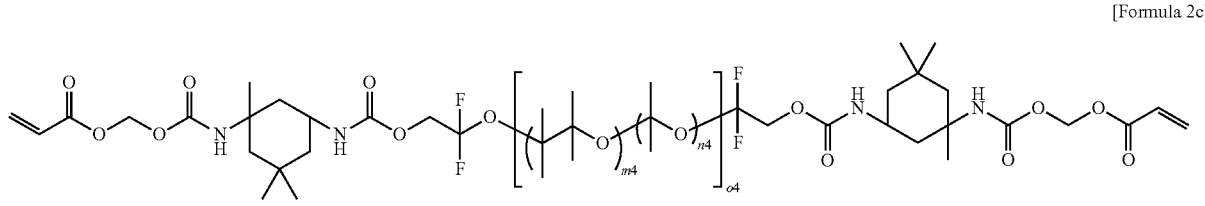

In Formula 2c,
each of m4, n4, and o4 is the number of repeating units,
m4 is an integer of 1 to 10,
n4 is an integer of 1 to 10, and
o4 is an integer of 1 to 500.

The copolymer represented by Formula 2 may have a weight-average molecular weight (Mw) of about 200 g/mol to about 100,000 g/mol, for example, 200 g/mol to 70,000 g/mol, and, in a case in which the weight-average molecular weight of the copolymer is within the above range, electrochemical stability as well as mechanical properties and processability (formability) may be secured. In this case, in Formula 1, m, n, and o may be appropriately changed within the above range depending on the weight-average molecular weight of the copolymer.

The weight-average molecular weight may be measured using gel permeation chromatography (GPC). For example, a sample having a predetermined concentration is prepared, and Alliance 4, a GPC measurement system, is then stabilized. When the system is stabilized, a standard sample and the sample are injected into the system to obtain a chromatogram, and a molecular weight is then calculated using an analytical method (system: Alliance 4, Column: Ultrahydrogel linear×2, eluent: 0.1M $NaNO_3$ (pH 7.0 phosphate buffer, flow rate: 0.1 mL/min, temp: 40° C., injection: 100 μL)).

In general, a polymer electrolyte is disadvantageous in that it has low ionic conductivity due to electrical resistance in comparison to a liquid electrolyte. In order to improve these disadvantages, research to improve high-voltage stability and ionic conductivity of the polymer electrolyte by using a copolymer including a specific repeating unit has recently emerged.

The copolymer represented by Formula 1, which constitutes the polymer electrolyte of the present invention, is an essentially incombustible compound, and is a polymer having thermal, chemical, and oxidation stability as well as low vapor pressure.

Since the copolymer represented by Formula 1 including a fluorine-substituted or unsubstituted polyalkylene ether repeating unit includes an anion stationary phase, such as $F^-$ and $O^-$, in its structure, the copolymer represented by Formula 1 may improve stability and effect of movement of lithium ions by suppressing a side reaction of lithium cation ($Li^+$) and decomposition of salt. Furthermore, with respect to a fluorinated structure, since electrostatic characteristics of a polymer main chain is increased due to high electronegativity, the fluorinated structure has an effect of strengthening the force of stabilizing or fixing an anion of the electrolyte. For example, in the polyalkylether copolymer represented by Formula 1, in a case in which both alkylene groups of $R_1$ and $R_2$ are substituted with fluorine, since the electrostatic characteristics of the polymer main chain has positive charge characteristics in comparison to a case where the alkylene groups are unsubstituted with fluorine, an effect of the interaction of the lithium salt with the anion is improved.

Thus, in the present invention, since the polymer having such a structure is included, a polymer electrolyte, in which interfacial resistance may be reduced and high ionic conductivity may be secured, may be prepared.

Also, in order to secure mechanical properties and improve room-temperature and low-temperature conductivity at the same time, the polymer electrolyte of the present invention may be prepared in the form of a composite further including a ceramic electrolyte.

Typical examples of the ceramic electrolyte may be a single material selected from the group consisting of a phosphate-based electrolyte selected from the group consisting of lithium phosphate ($Li_3PO_4$), lithium titanium phosphate ($Li_xTi_y(PO_4)_3$), lithium aluminum titanium phosphate ($Li_xAl_yTi_z(PO_4)_3$; LATP), and lithium aluminum germanium phosphate ($Li_{1.5}Al_{0.5}Ge_{1.5}(PO_4)_3$; LAGP); a sulfide-based electrolyte selected from the group consisting of $SiS_2(Li_xSi_yS_z)$-based glass, $P_2S_5(Li_xP_yS_z)$-based glass, lithium germanium thiophosphate, and lithium phosphorus sulfide-based glass; lithium lanthanum titanate ($Li_{0.5}La_{0.5}TiO_3$; LLTO); lithium nitride ($Li_xN_y$); lithium lanthanum zirconate ($Li_7La_3Zr_2O_{12}$; LLZO); and tantalum pentoxide ($Ta_2O_5$), or a mixture of two or more thereof.

In the polymer electrolyte of the present invention, an amount of the copolymer may be higher than that of the ceramic electrolyte in order to reduce the interfacial resistance or increase flexibility of a polymer electrolyte film. Specifically, a weight ratio of the copolymer represented by Formula 2: the ceramic electrolyte may be appropriately changed depending on a curvature of the surface of the electrode and an operating temperature of a cell, and may specifically be in a range of 1:0.1 to 1:9, for example, 1:0.1 to 1:6.

When the weight ratio of the ceramic electrolyte to the copolymer represented by Formula 2 is greater than 9, formation of the polymer electrolyte composite is difficult. Furthermore, in order to effectively improve an increase in the interfacial resistance with the electrode, the ceramic electrolyte is preferably included in an amount of 6 or less with respect to of the copolymer represented by Formula 2. If the weight ratio of the ceramic electrolyte to the copolymer represented by Formula 2 is less than 0.1, an effect of improving the room-temperature and low-temperature conductivity is low.

Furthermore, in order to secure mechanical properties and improve electrochemical stability at the same time, the polymer electrolyte of the present invention may be prepared in the form of a composite further including inorganic particles.

Typical examples of the inorganic particles may be a single material selected from the group consisting of $Al_2O_3$, $BaTiO_3$, $SnO_2$, $CeO_2$, $SiO_2$, $TiO_2$, $Li_3PO_4$, NiO, ZnO, MgO, $Mg(OH)_2$, CaO, $ZrO_2$, $Y_2O_3$, Pb(Zr, Ti) $O_3$ (PZT), $Pb_{1-x}La_xZr_{1-y}Ti_yO_3$ (PLZT, where, $0<x<1$ and $0<y<1$), $PB(Mg_3Nb_{2/3})O_3$—$PbTiO_3$ (PMN-PT), and hafnia ($HfO_2$), or a mixture of two or more thereof.

In a case in which the inorganic particles are included in the polymer electrolyte, a weight ratio of the copolymer represented by Formula 2: the inorganic particles may be in a range of 1:0.1 to 1:7.0, for example, 1:0.2 to 1:7.0. when the weight ratio of inorganic particles to the copolymer represented by Formula 2 is greater than 7.0, the formation of the polymer electrolyte is not only difficult, but an additional electrolyte capable of filling pores is also needed due to the pores formed in the film.

Also, the polymer electrolyte may further include a binder to obtain an effect of increasing dispersibility of the particles or strength of the film.

A typical binder used in the preparation of the electrode may be used as the above binder, and, non-limiting examples of the binder may be polyvinylidene fluoride (PVDF), a styrene-butadiene rubber (SBR), and Teflon, or a mixture thereof.

A small amount of the binder may be included, and, specifically, a weight ratio of the copolymer represented by Formula 2: the binder may be in a range of 1:0.1 to 1:0.5.

when the weight ratio of the binder to the copolymer represented by Formula 2 is greater than 0.5, since the resistance is increased, the ionic conductivity may be significantly reduced.

In some cases, the polymer electrolyte of the present invention may further include a plasticizer to obtain an effect of enhancing ion transfer characteristics.

The plasticizer may include at least one compound of a carbonate-based compound, a lactone-based compound, an alkyl ether-based compound, an alkyl acetate-based compound, and an alkyl propionate-based compound.

Specifically, typical examples of the carbonate-based compound may include a single material selected from the group consisting of cyclic carbonate and linear carbonate, or a mixture thereof, and the carbonate-based compound may specifically include cyclic carbonate.

Examples of the cyclic carbonate may be ethylene carbonate (EC), propylene carbonate (PC), butylene carbonate (BC), and fluoroethylene carbonate (FEC), and, examples of the linear carbonate may be diethyl carbonate (DEC), dimethyl carbonate (DMC), dipropyl carbonate (DPC), ethylmethyl carbonate (EMC), and methylpropyl carbonate (MPC).

Also, the lactone-based compound may include γ-butyrolactone, and the ether-based solvent may include glyme.

The alkyl ether-based compound may include at least one selected from the group consisting of dimethyl ether, diethyl ether, dipropyl ether, methylethyl ether, methylpropyl ether, and ethylpropyl ether.

The alkyl acetate-based compound may include at least one selected from the group consisting of methyl acetate, ethyl acetate, and propyl acetate.

The alkyl propionate-based compound may include at least one selected from the group consisting of methyl propionate, ethyl propionate, propyl propionate, and butyl propionate.

The plasticizer may be included in an amount of 10 wt % to 50 wt % based on a total weight of the polymer electrolyte.

The polymer electrolyte of the present invention may have an ionic conductivity of $2.0\times10^{-4}$ S/cm or more at 25° C. The polymer electrolyte of the present invention may have an ionic conductivity of $4.0\times10^{-4}$ S/cm or more at 25° C., for example, $7.5\times10^{-4}$ S/cm or more at 25° C. Also, the polymer electrolyte may have a total resistance of 0 kΩ to 200 kΩ.

The ionic conductivity may be measured by an alternating current impedance method as a function of temperature in a frequency range of 0.1 Hz to 100 MHz using a VMP3 measurement instrument and 4294A.

Furthermore, in an embodiment of the present invention, provided is a lithium secondary battery including a positive electrode, a negative electrode, and a polymer electrolyte formed on at least one surface of the positive electrode and the negative electrode, wherein the polymer electrolyte includes the polymer electrolyte of the present invention.

The polymer electrolyte, as a free-standing polymer electrolyte, may function as a separator in the form of a membrane film, instead of a typical separator.

The lithium secondary battery of the present invention may further include a separator, if necessary.

In this case, the polymer electrolyte is prepared in the form of a film and is then disposed (introduced) on at least one surface of the prepared negative electrode, positive electrode, and separator, or after a lithium salt and the copolymer represented by Formula 1 are dissolved in an organic solvent to be prepared as a coating solution, the polymer electrolyte may be introduced by directly coating at least one surface of the prepared negative electrode, positive electrode, and separator with the coating solution and then drying and curing the at least one surface coated.

In this case, the curing may be performed by heat or light irradiation.

A thickness of the polymer electrolyte may be as thin as possible in consideration of the ionic conductivity, and may specifically be in a range of about 0.5 μm to about 300 μm. In a case in which the thickness of the electrolyte film is 0.5 μm or more, strength of the film may be secured, and, in a case in which the thickness is 300 μm or less, since a proton ($H^+$), as an ion transporter, may easily pass through the film, an increase in volume for each secondary battery stack is prevented, and thus, a high-performance secondary battery may be prepared.

The positive electrode and the negative electrode constituting the lithium secondary battery of the present invention may be prepared by a conventional method and used.

First, the positive electrode may be prepared by forming a positive electrode material mixture layer on a positive electrode collector. The positive electrode material mixture layer may be formed by coating the positive electrode collector with a positive electrode slurry including a positive electrode active material, a binder, a conductive agent, and a solvent, and then drying and rolling the coated positive electrode collector.

The positive electrode collector is not particularly limited so long as it has high conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. Specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where 0<Y<1), $LiMn_{2-Z}Ni_ZO_4$ (where 0<Z<2), etc.), lithium-nickel-cobalt-based oxide (e.g., $LiNi_{1-Y1}Co_{Y1}O_2$ (where 0<Y1<1), lithium-manganese-cobalt-based oxide (e.g., $LiCo_{1-Y2}Mn_{Y2}O_2$ (where 0<Y2<1), $LiMn_{2-Z1}Co_{Z1}O_4$ (where 0<Z1<2), etc.), lithium-nickel-manganese-cobalt-based oxide (e.g., $Li(Ni_pCo_qMn_{r1})O_2$ (where 0<p<1, 0<q<1, 0<r1<1, and p+q+r1=1) or $Li(Ni_{p1}Co_{q1}Mn_{r2})O_4$ (where 0<p1<2, 0<q1<2, 0<r2<2, and p1+q1+r2=2), etc.), or lithium-nickel-cobalt-transition metal (M) oxide (e.g., $Li(Ni_{p2}Co_{q2}Mn_{r3}M_{S2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein 0<p2<1, 0<q2<1, 0<r3<1, 0<S2<1, and p2+q2+r3+S2=1), etc.), and any one thereof or a compound of two or more thereof may be included.

Among these materials, in terms of the improvement of capacity characteristics and stability of the battery, the lithium composite metal oxide may include $LiCoO_2$, $LiMnO_2$, $LiNiO_2$, lithium nickel manganese cobalt oxide (e.g., $Li(Ni_{1/3}Mn_{1/3}Co_{1/3})O_2$, $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or Li(Ni$_{0.8}$Mn$_{0.1}$Co$_{0.1}$)O$_2$), or lithium nickel cobalt aluminum oxide (e.g., LiNi$_{0.8}$Co$_{0.15}$Al$_{0.05}$O$_2$, etc.).

The positive electrode active material may be included in an amount of 80 wt % to 99 wt % based on a total weight of solid content in the positive electrode slurry.

The binder is a component that assists in the binding between the active material and the conductive agent and in the binding with the current collector, wherein the binder is commonly added in an amount of 1 wt % to 30 wt % based on the total weight of the solid content in the positive electrode slurry. Examples of the binder may be polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene-butadiene rubber, a fluoro rubber, various copolymers, and the like.

The conductive agent is commonly added in an amount of 1 wt % to 30 wt % based on the total weight of the solid content in the positive electrode slurry.

Any conductive agent may be used without particular limitation so long as it has suitable conductivity without causing adverse chemical changes in the battery, and, for example, a conductive material such as: graphite; a carbon-based material such as carbon black, acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used. Specific examples of a commercial conductive agent may include acetylene black-based products (Chevron Chemical Company, Denka black (Denka Singapore Private Limited), or Gulf Oil Company), Ketjen black, ethylene carbonate (EC)-based products (Armak Company), Vulcan XC-72 (Cabot Company), and Super P (Timcal Graphite & Carbon).

The solvent may include an organic solvent, such as N-methyl-2-pyrrolidone (NMP), and may be used in an amount such that desirable viscosity is obtained when the positive electrode active material as well as selectively the binder and the conductive agent are included. For example, the solvent may be included so that a concentration of the solid content in the slurry including the positive electrode active material as well as selectively the binder and the conductive agent is in a range of 40 wt % to 60 wt %, for example, 40 wt % to 50 wt %.

Also, the negative electrode may be prepared by forming a negative electrode material mixture layer on a negative electrode collector. The negative electrode material mixture layer may be formed by coating the negative electrode collector with a negative electrode slurry including a negative electrode active material, a binder, a conductive agent, and a solvent, and then drying and rolling the coated negative electrode collector.

The negative electrode collector generally has a thickness of 3 μm to 500 μm. The negative electrode collector is not particularly limited so long as it has conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material. The negative electrode collector may have various shapes such as a film, a sheet, a foil, a net, a porous body, a foam body, a non-woven fabric body, and the like.

Furthermore, the negative electrode active material may include a single material selected from the group consisting of lithium-containing titanium composite oxide (LTO); a carbon-based material such as non-graphitizable carbon and graphite-based carbon; a complex metal oxide such as Li$_x$Fe$_2$O$_3$ (0≤x≤1), Li$_{x2}$WO$_2$ (0≤x2≤1), Sn$_{x3}$Me$_{1-x3}$Me'$_{y3}$O$_z$ (Me: manganese (Mn), iron (Fe), lead (Pb), or germanium (Ge); Me': aluminum (Al), boron (B), phosphorus (P), silicon (Si), Groups I, II and III elements of the periodic table, or halogen; 0<x3≤1; 1≤y3≤3; 1≤z≤8); a lithium metal; a lithium alloy; a silicon-based alloy; a tin-based alloy; a metal oxide such as SnO, SnO$_2$, PbO, PbO$_2$, Pb$_2$O$_3$, Pb$_3$O$_4$, Sb$_2$O$_3$, Sb$_2$O$_4$, Sb$_2$O$_5$, GeO, GeO$_2$, Bi$_2$O$_3$, Bi$_2$O$_4$, and Bi$_2$O$_5$; and a conductive polymer such as polyacetylene, or a mixture of two or more thereof.

The negative electrode active material may be included in an amount of 80 wt % to 99 wt % based on a total weight of solid content in the negative electrode slurry.

The binder is a component that assists in the binding between the conductive agent, the active material, and the current collector, wherein the binder is commonly added in an amount of 1 wt % to 30 wt % based on the total weight of the solid content in the negative electrode slurry. Examples of the binder may be polyvinylidene fluoride, polyvinyl alcohol, carboxymethylcellulose, starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber, a fluoro rubber, and various copolymers thereof.

The conductive agent is a component for further improving the conductivity of the negative electrode active material, wherein the conductive agent may be added in an amount of 1 wt % to 20 wt % based on the total weight of the solid content in the negative electrode slurry. Any conductive agent may be used without particular limitation so long as it has suitable conductivity without causing adverse chemical changes in the battery, and, for example, a conductive material such as: graphite such as natural graphite or artificial graphite; carbon black such as acetylene black, Ketjen black, channel black, furnace black, lamp black, and thermal black; conductive fibers such as carbon fibers and metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used.

The solvent may include water, or an organic solvent, such as N-methyl-2-pyrrolidone (NMP) and alcohol, and may be used in an amount such that desirable viscosity is obtained when the negative electrode active material as well as selectively the binder and the conductive agent are included. For example, the solvent may be included so that a concentration of the solid content in the slurry including the negative electrode active material as well as selectively the binder and the conductive agent is in a range of 50 wt % to 75 wt %, for example, 50 wt % to 65 wt %.

Next, a separator is selectively introduced between the positive electrode and the negative electrode.

The separator plays a role in blocking an internal short circuit between both electrodes and impregnating the electrolyte, wherein, after mixing a polymer resin, a filler, and a solvent to prepare a separator composition, the separator composition is directly coated on the electrode and dried to form a separator film, or, after the separator composition is cast on a support and dried, the separator may be prepared by laminating a separator film peeled from the support on the electrode.

The polymer resin is not particularly limited and, for example, an olefin-based polymer such as chemical resistant and hydrophobic polypropylene; a composite porous separator in which an inorganic material is added to a porous separator base material; and a sheet or nonwoven fabric formed of glass fibers or polyethylene are used.

The porous separator may generally have a pore diameter of 0.01 µm to 50 µm and a porosity of 5% to 95%. Also, the porous separator may generally have a thickness of 5 µm to 300 µm.

Subsequently, a polymer electrolyte is disposed on at least one surface of the positive electrode and the negative electrode, or at least one surface of the positive electrode, the negative electrode, and the separator.

After dissolving a lithium salt and the copolymer represented by Formula 1 in a solvent to prepare a coating solution, the polymer electrolyte may be prepared by coating at least one surface of the prepared negative electrode, positive electrode, and separator with the coating solution and then drying the coated surface, or a lithium salt and the copolymer represented by Formula 1 are used to prepare in the form of a film and the film is then disposed (introduced) on at least one surface of the prepared negative electrode, positive electrode, and separator.

The coating solution may include an organic solvent, such as N-methyl pyrrolidone (NMP), acetone, dimethylacetamide, or dimethylformaldehyde, an inorganic solvent, such as water, or a mixture thereof, as a main solvent, and the solvent may be removed in the subsequent drying operation.

As described above, in the present invention, since the polymer electrolyte including the copolymer represented by Formula 1 is introduced into components of the lithium secondary battery, the mechanical properties may be secured and, simultaneously, a high output effect may be obtained by improving low room-temperature ionic conductivity.

Figure 2:
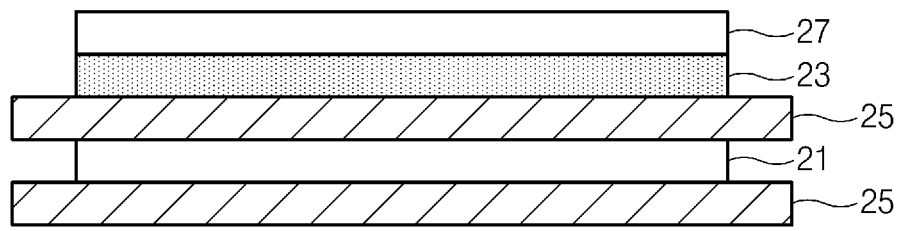
Figure 3:
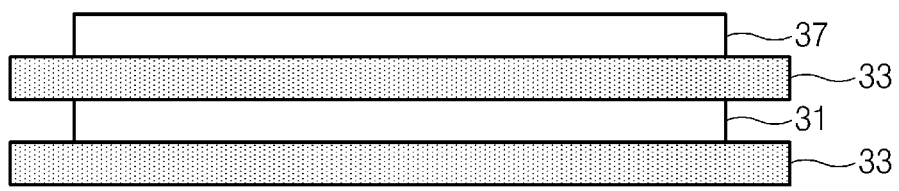

Hereinafter, examples of various configurations of lithium secondary batteries including the polymer electrolyte according to the embodiment of the present invention are schematically illustrated in FIGS. 1 through 3, but the present invention is not limited thereto.

As illustrated in FIG. 1, the lithium secondary battery of the present invention includes a polymer electrolyte 13 disposed on an interface between a negative electrode 11 and a porous separator 15, and a positive electrode 17 disposed on another surface of the separator.

As illustrated in FIG. 2, the lithium secondary battery according to another aspect of the present invention includes a polymer electrolyte 23 disposed on an interface between a positive electrode 27 and a porous separator 25, and a negative electrode 21 disposed on another surface of the separator.

As illustrated in FIG. 3, the lithium secondary battery according to another example of the present invention includes a polymer electrolyte 33 disposed on an interface between a positive electrode 37 and a negative electrode 31, instead of a separator, and the polymer electrolyte 33 disposed on another surface of the negative electrode.

Also, in the lithium secondary battery of the present invention, an electrode assembly may be prepared by a typical method, for example, winding or folding the negative electrode, the polymer electrolyte of the present invention, and the positive electrode, as well as selectively the separator which are sequentially stacked as illustrated in FIGS. 1 to 3.

Subsequently, the lithium secondary battery according to the embodiment of the present invention may be prepared by accommodating the electrode assembly into a case and sealing the case.

In general, in a case in which a solid electrolyte is used, a secondary battery is prepared by including only the solid electrolyte without an added solvent, wherein, in this case, properties of a solid electrolyte layer itself should be excellent. However, with respect to the solid electrolyte, since ionic conductivity is poorer than that of a liquid electrolyte, various problems may arise in actually applying the battery using the solid electrolyte in various ways.

In contrast, in the present invention, since the polymer electrolyte is formed to have a thickness of about 0.5 µm to about 300 µm and introduced, conductivity similar to that of a separator currently used, in which an electrolyte solution is impregnated, may be secured, and, with respect to some composite-type electrolytes, performance superior to that of the electrolyte solution may also be obtained by an additional improvement of the conductivity and an increase in degree of freedom of Li. In particular, even if there is a reduction in room-temperature conductivity, reduction in ionic conductivity at high temperature may be minimized. Thus, lifetime and safety of a high-temperature battery may be secured.

Furthermore, in the preset invention, in order to achieve strengthening of the ionic conductivity and reduction of the interfacial resistance after cell assembly, a predetermined level of a liquid electrolyte solution may be further injected in to the case.

In this case, the liquid electrolyte solution includes an electrolyte salt and a non-aqueous organic solvent.

The electrolyte salt is a lithium salt usable as a conventional electrolyte salt for an electrochemical device, wherein the electrolyte salt may be composed of a combination of (i) a cation selected from the group consisting of $Li^+$, $Na^+$, and $K^+$, and (ii) an anion selected from the group consisting of $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$ and $C(CF_2SO_2)_3^-$.

The electrolyte salt may be included in a concentration of 1 M to 2 M in the electrolyte solution.

Also, the non-aqueous organic solvent is not particularly limited as long as it is a conventionally usable organic solvent, and, as a typical example, the non-aqueous organic solvent may further include a second organic solvent including at least one compound of a cyclic carbonate-based compound, a linear carbonate-based compound, an alkyl ether-based compound, an alkyl acetate-based compound, an alkyl propionate-based compound, and a nitrile-based compound.

In this case, examples of the cyclic carbonate-based compound may include at least one selected from the group consisting of ethylene carbonate (EC), propylene carbonate (PC), butylene carbonate (BC), and fluoroethylene carbonate (FEC).

The linear carbonate-based compound may include at least one selected from the group consisting of dimethyl carbonate (DMC), diethyl carbonate (DEC), dipropyl carbonate, ethylmethyl carbonate (EMC), methylpropyl carbonate, and ethylpropyl carbonate.

The alkyl ether-based compound may include at least one selected from the group consisting of dimethyl ether, diethyl ether, dipropyl ether, methylethyl ether, methylpropyl ether, and ethylpropyl ether.

The alkyl acetate-based compound may include at least one selected from the group consisting of methyl acetate, ethyl acetate, and propyl acetate.

The alkyl propionate-based compound may include at least one selected from the group consisting of methyl propionate, ethyl propionate, propyl propionate, and butyl propionate.

The nitrile-based compound may include at least one selected from the group consisting of acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, di fluorobenzonitrile, tri fluorobenzonitrile, phenylacetonitrile, 2-fluorophenylacetonitrile, and 4-fluorophenylacetonitrile.

Since ethylene carbonate and propylene carbonate, as the cyclic carbonate compounds, are highly viscous organic solvents and have high dielectric constants, the ethylene carbonate and propylene carbonate may well dissociate the lithium salt in the electrolyte. Thus, the ethylene carbonate and propylene carbonate may be used. Also, since an electrolyte solution having high electrical conductivity may be prepared when the above cyclic carbonate is mixed with low viscosity, low dielectric constant linear carbonate, such as ethylmethyl carbonate, dimethyl carbonate, or diethyl carbonate, in an appropriate ratio, the mixture may be mixed and used.

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

A positive electrode slurry was prepared by adding 92 wt % of a 4.2 V-class $LiCoO_2$ compound as a positive electrode active material, 4 wt % of carbon black as a conductive agent, and 2 wt % of polyvinylidene fluoride (PVDF), as a binder component, to N-methyl-2-pyrrolidone (NMP) as a solvent.

A 20 μm thick aluminum (Al) thin film was coated with the positive electrode mixture slurry to a thickness of 10 μm and dried to prepare the positive electrode 27.

Subsequently, a coating solution was prepared by dissolving 2 g of the copolymer of Formula 2a (weight-average molecular weight (Mw) 10,000) and 0.22 g of a lithium salt (LiTFSI) (weight ratio of 9:1) in an N-methylpyrrolidone solvent (97.78 g). The coating solution was coated on a surface of the positive electrode and dried to prepare the polymer electrolyte 23 having a thickness of 1 μm.

A 20 μm thick copper foil was coated with 20 μm thick Li metal to prepare the negative electrode 21.

As illustrated in FIG. 2, an electrode assembly was prepared by disposing the polyolefin-based separator (thickness: 20 μm) 25 between the prepared negative electrode and positive electrode including the polymer electrolyte, the electrode assembly was accommodated in a pouch type battery case, and a liquid electrolyte solution, in which 1 M LiFSI was added to a solvent in which EC and DEC were mixed (EC/DEC=5:5), was injected thereinto to prepare a 4.2 V-class full cell.

Example 2

A positive electrode slurry was prepared by adding 92 wt % of $LiCoO_2$ as a positive electrode active material, 4 wt % of carbon black as a conductive agent, and 4 wt % of PVDF, as a binder component, to N-methyl-2-pyrrolidone (NMP) as a solvent. A 20 μm thick aluminum thin film was coated with the positive electrode mixture slurry to a thickness of 10 μm and dried to prepare the positive electrode 17.

A 20 μm thick copper foil was coated with 20 μm thick Li metal to prepare the negative electrode 11.

Subsequently, a coating solution was prepared by dissolving 2 g of the copolymer of Formula 2a (weight-average molecular weight (Mw) 10,000), 0.22 g of a lithium salt (LiTFSI) (weight ratio of 9:1), and 3 g of lithium lanthanum zirconate (LLZO) in an N-methylpyrrolidone solvent (94.78 g). The coating solution was coated on a surface of the negative electrode and dried to prepare the polymer electrolyte 13 having a thickness of 1 μm.

As illustrated in FIG. 1, an electrode assembly was prepared by disposing the polyolefin-based separator (thickness: 20 μm) 15 between the prepared positive electrode and negative electrode including the polymer electrolyte, the electrode assembly was accommodated in a pouch type battery case, and an electrolyte solution, in which 1 M LiFSI was added to a solvent in which EC and DEC were mixed (EC/DEC=5:5), was injected thereinto to prepare a 4.2 V-class full cell.

Example 3

A battery was prepared in the same manner as in Example 2 except that $Al_2O_3$ was included instead of lithium lanthanum zirconate (LLZO) during the preparation of the polymer electrolyte in Example 2.

Example 4

A positive electrode slurry was prepared by adding 92 wt % of a 4.2 V-class $LiCoO_2$ compound as a positive electrode active material, 4 wt % of carbon black as a conductive agent, and 2 wt % of PVDF, as a binder component, to N-methyl-2-pyrrolidone (NMP) as a solvent.

A 20 μm thick aluminum (Al) thin film was coated with the positive electrode mixture slurry to a thickness of 10 μm and dried to prepare the positive electrode 37.

Subsequently, a coating solution was prepared by dissolving 2 g of the copolymer of Formula 2a (weight-average molecular weight (Mw) 10,000), 0.22 g of a lithium salt (LiTFSI) (weight ratio of 9:1), 12 g of lithium lanthanum zirconate (LLZO), and 0.28 g of PVDF, as a binder, in an N-methylpyrrolidone solvent (85.5 g) as in the case of preparing the polymer electrolyte of Example 1. The coating solution was coated on a surface of the positive electrode and dried to prepare the polymer electrolyte 33 having a thickness of 1 μm.

A 20 μm thick copper foil was coated with 20 μm thick Li metal to prepare the negative electrode 31.

Subsequently, a coating solution was prepared by dissolving 2 wt % of the copolymer of Formula 1a (weight-average molecular weight (Mw) 10,000), 0.2 wt % of a lithium salt (LiTFSI), 3 wt % of lithium lanthanum zirconate (LLZO), and 0.28 wt % of PVDF in an N-methylpyrrolidone solvent. The coating solution was coated on a surface of the negative electrode and dried to prepare the polymer electrolyte 33 having a thickness of 100 μm.

As illustrated in FIG. 3, an electrode assembly was prepared by stacking the prepared positive electrode and negative electrode including the polymer electrolyte without a separator, the electrode assembly was accommodated in a pouch type battery case, and an electrolyte solution, in which 1 M LiFSI was added to a solvent in which EC and DEC were mixed (EC/DEC=5:5), was injected thereinto to prepare a 4.2 V-class full cell.

Example 5

A battery was prepared in the same manner as in Example 1 except that the copolymer represented by Formula 2b was included instead of the copolymer of Formula 2a during the preparation of the polymer electrolyte in Example 1.

Example 6

A battery was prepared in the same manner as in Example 1 except that the copolymer of Formula 2c was included instead of the copolymer of Formula 2a during the preparation of the polymer electrolyte in Example 1.

Example 7

A battery was prepared in the same manner as in Example 1 except that a plasticizer (FEC) was further added during the preparation of the polymer electrolyte in Example 1.

Comparative Example 1

A battery was prepared in the same manner as in Example 1 except that a copolymer represented by Formula 3 was included instead of the copolymer of Formula 2a in Example 1.

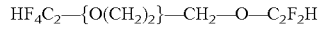

$HF_4C_2-\{O(CH_2)_2\}-CH_2-O-C_2F_2H$      [Formula 3]

Comparative Example 2

A battery was prepared in the same manner as in Example 1 except that a copolymer represented by Formula 4 was included instead of the copolymer of Formula 2a in Example 1.

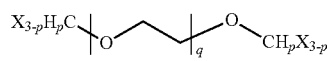

[Formula 4]

wherein, X=F, p=0, and q=4.

Experimental Examples

Experimental Example 1. Ionic Conductivity Measurement

The polymer electrolytes used in Examples 1 to 7 and Comparative Examples 1 and 2 were respectively prepared as films having a thickness of 20 μm, and a gold (Au) electrode was coated on each of the polymer electrolyte film using a sputtering method. Subsequently, a 1 M LiPF$_6$ electrolyte solution with a mixed solvent of FEC and EMC (FEC/EMC=3/7) was injected to prepare each sample battery for measurement, and ionic conductivity was then measured. In this case, the ionic conductivity was measured by an alternating current impedance method in a frequency range of 0.1 Hz to 100 MHz using a VMP3 measurement instrument and 4294A at 25° C. The measurement results are presented in Table 1 below.

TABLE 1

| | Temperature (° C.) | Ionic conductivity (S/cm) |
|---|---|---|
| Example 1 | 25 | $3.0 \times 10^{-4}$ |
| Example 2 | 25 | $6.8 \times 10^{-4}$ |
| Example 3 | 25 | $4.0 \times 10^{-4}$ |
| Example 4 | 25 | $5.2 \times 10^{-4}$ |
| Example 5 | 25 | $2.5 \times 10^{-4}$ |
| Example 6 | 25 | $1.2 \times 10^{-4}$ |
| Example 7 | 25 | $4.5 \times 10^{-4}$ |
| Comparative Example 1 | 25 | $8.5 \times 10^{-5}$ |
| Comparative Example 2 | 25 | $6.4 \times 10^{-5}$ |

As illustrated in Table 1, with respect to the polymer electrolytes of Examples 1 to 7 including polymer and electron acceptor of the present invention, it may be understood that ionic conductivities were mostly excellent at about $1.2 \times 10^{-4}$ or more.

In particular, the ionic conductivity of the polymer electrolyte of Example 1 composed of the copolymer represented by Formula 2a was $3.0 \times 10^{-4}$, wherein it may be understood that the ionic conductivity of the polymer electrolyte of Example 1 was better than $2.5 \times 10^{-4}$ and $1.2 \times 10^{-4}$, the ionic conductivities of the polymer electrolytes of Examples 5 and 6 composed of the copolymer represented by Formula 2b and 2c, respectively.

Also, the ionic conductivities of the polymer electrolytes of Examples 2 and 3 further including the ceramic electrolyte were respectively $6.8 \times 10^{-4}$ and $4.0 \times 10^{-4}$, and the ionic conductivity of the polymer electrolyte of Example 4 further including the binder was $5.2 \times 10^{-4}$, wherein it may be understood that each of these ionic conductivities was significantly improved in comparison to the ionic conductivity of the polymer electrolyte of Example 1.

In contrast, the ionic conductivity of the polymer electrolyte of Comparative Example 1 was $8.5 \times 10^{-5}$ and the ionic conductivity of the polymer electrolyte of Comparative Example 2 was $6.4 \times 10^{-5}$, wherein it may be understood that these ionic conductivities were lower than those of the polymer electrolytes of Examples 1 to 7.

Experimental Example 2. Cycle Life Characteristics

First, a secondary battery of Reference Example 1 was prepared in the same manner as in Example 1 except that a polymer electrolyte was not included.

The lithium secondary batteries of Examples 1 to 7 and the lithium secondary batteries of Comparative Examples 1 and 2 were cycled at charge and discharge rates of 0.2 C (4.2 V)/0.7 C (3.0 V) at 25° C. to measure charge and discharge capacities, and the results thereof are presented in Table 2 below.

TABLE 2

| | 4.2 V/3.0 V | Capacity retention after 100 cycles (%) |
|---|---|---|
| Example 1 | 25° C., 0.2 C/0.7 C | 70 |
| Example 2 | 25° C., 0.2 C/0.7 C | 92 |
| Example 3 | 25° C., 0.2 C/0.7 C | 85 |
| Example 4 | 25° C., 0.2 C/0.7 C | 90 |
| Example 5 | 25° C., 0.2 C/0.7 C | 60 |
| Example 6 | 25° C., 0.2 C/0.7 C | 40 |
| Example 7 | 25° C., 0.2 C/0.7 C | 87 |
| Reference Example 1 | 25° C., 0.2 C/0.7 C | 5 |
| Comparative Example 1 | 25° C., 0.2 C/0.7 C | 20 |
| Comparative Example 2 | 25° C., 0.2 C/0.7 C | 10 |

As illustrated in Table 2, the secondary battery of Reference Example 1 had a capacity retention after 100 cycles of 5%, but, with respect to the secondary batteries of Examples 1 to 7 including the polymer electrolyte of the present invention, it may be understood that their capacity retentions after 100 cycles were excellent at about 40% or more.

In contrast, capacity retentions after 100 cycles of the secondary batteries of Comparative Examples 1 and 2 were respectively 20% and 10%, wherein it may be understood that the capacity retentions after 100 cycles of the secondary batteries of Comparative Examples 1 and 2 were significantly lower than those of the secondary batteries of Examples 1 to 7.

The invention claimed is:

1. A polymer electrolyte comprising:
a lithium salt; and
a copolymer represented by Formula 1b or 1c:

[Formula 1b]

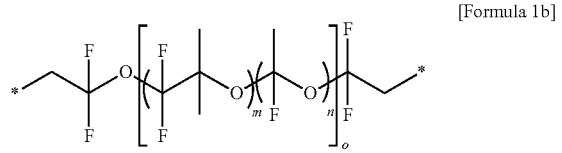

[Formula 1c]

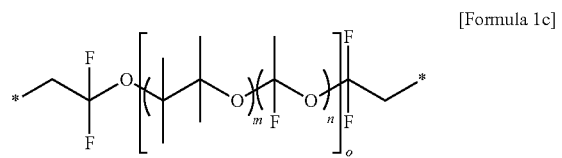

wherein, in Formula 1b and 1c,
each of m, n, and o is the number of repeating units,
m is an integer of 1 to 10,
n is an integer of 1 to 10, and
o is an integer of 1 to 500.

2. A polymer electrolyte, comprising:
a lithium salt; and
a copolymer represented by Formula 2:

wherein, in Formula 2, $R'_1$ and $R'_2$ are each independently a fluorine-substituted or unsubstituted alkylene group having 1 to 4 carbon atoms, $R_3$ is hydrogen, or an alkyl group having 1 to 6 carbon atoms, $R_4$ is an alkylene group having 1 to 6 carbon atoms, $R_5$ is an alkylene group having 1 to 5 carbon atoms, or —CO—NH—$R_6$—NH—CO—O—, $R_6$ is an aliphatic, alicyclic, or aromatic hydrocarbon group, each of m1, n1, and o1 is the number of repeating units, m1 is an integer of 1 to 10, n1 is an integer of 1 to 10, and o1 is an integer of 1 to 500.

3. The polymer electrolyte of claim 2, wherein a weight ratio of the copolymer represented by Formula 1 to the lithium salt is in a range of 7:3 to 9.5:0.5.

4. The polymer electrolyte of claim 2, wherein the aliphatic hydrocarbon group comprises an alkylene group having 1 to 20 carbon atoms; an alkylene group having 1 to 20 carbon atoms which contains an isocyanate group (NCO); an alkoxylene group having 1 to 20 carbon atoms; an alkenylene group having 2 to 20 carbon atoms; or an alkynylene group having 2 to 20 carbon atoms, the alicyclic hydrocarbon group comprises a substituted or unsubstituted cycloalkylene group having 4 to 20 carbon atoms; a substituted or unsubstituted cycloalkylene group having 4 to 20 carbon atoms which contains an isocyanate group (NCO); a cycloalkenylene group having 4 to 20 carbon atoms; or a heterocycloalkylene group having 2 to 20 carbon atoms, and the aromatic hydrocarbon group comprises a substituted or unsubstituted arylene group having 6 to 20 carbon atoms; or a heteroarylene group having 2 to 20 carbon atoms.

5. The polymer electrolyte of claim 2, wherein the copolymer represented by Formula 2 comprises at least one selected from the group consisting of copolymers represented by Formulae 2a to 2c:

[Formula 2]

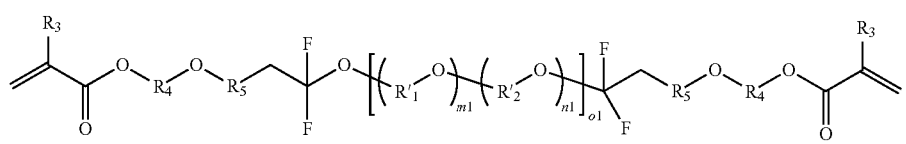

[Formula 2a]

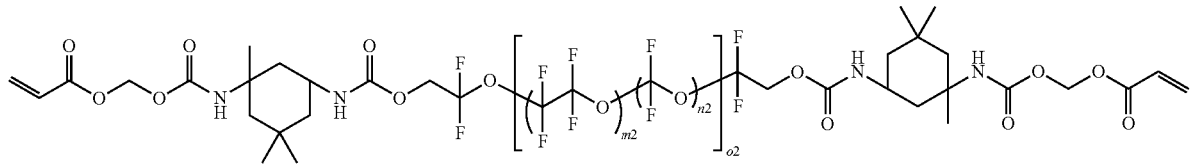

wherein, in Formula 2a,
each of m2, n2, and o2 is the number of repeating units,
m2 is an integer of 1 to 10,
n2 is an integer of 1 to 10, and
o2 is an integer of 1 to 500,

[Formula 2b]

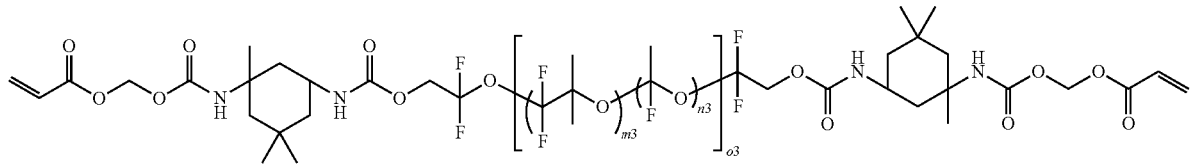

wherein, in Formula 2b,
each of m3, n3, and o3 is the number of repeating units,
m3 is an integer of 1 to 10,
n3 is an integer of 1 to 10, and
o3 is an integer of 1 to 500,

[Formula 2c]

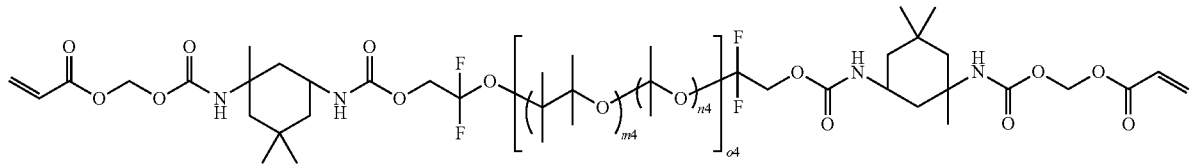

wherein, in Formula 2c,
each of m4, n4, and o4 is the number of repeating units,
m4 is an integer of 1 to 10,
n4 is an integer of 1 to 10, and
o4 is an integer of 1 to 500.

6. The polymer electrolyte of claim 2, wherein the copolymer represented by Formula 2 has a weight-average molecular weight (Mw) of 200 g/mol to 100,000 g/mol.

7. The polymer electrolyte of claim 2, further comprising a ceramic electrolyte.

8. The polymer electrolyte of claim 7, wherein the ceramic electrolyte comprises a single material selected from the group consisting of a phosphate-based electrolyte selected from the group consisting of lithium phosphate, lithium titanium phosphate, lithium aluminum titanium phosphate, and lithium aluminum germanium phosphate; a sulfide-based electrolyte selected from the group consisting of $SiS_2(Li_xSi_yS_z)$-based glass, $P_2S_5(Li_xP_yS_z)$-based glass, lithium germanium thiophosphate, and lithium phosphorus sulfide-based glass; lithium lanthanum titanate; lithium nitride; lithium lanthanum zirconate; and tantalum pentoxide, or a mixture of two or more thereof.

9. The polymer electrolyte of claim 2, further comprising inorganic particles.

10. The polymer electrolyte of claim 9, wherein the inorganic particles comprise a single material selected from the group consisting of $Al_2O_3$, $BaTiO_3$, $SnO_2$, $CeO_2$, $SiO_2$, $TiO_2$, $Li_3PO_4$, NiO, ZnO, MgO, $Mg(OH)_2$, CaO, $ZrO_2$, $Y_2O_3$, $Pb(Zr,Ti)O_3$, $Pb_{1-x}La_xZr_{1-y}Ti_yO_3$ (where, $0<x<1$ and $0<y<1$), $PB(Mg_3Nb_{2/3})O_3$—$PbTiO_3$, and hafnia, or a mixture of two or more thereof.

11. The polymer electrolyte of claim 2, further comprising a plasticizer.

12. The polymer electrolyte of claim 11, wherein the plasticizer comprises at least one compound of a carbonate-based compound, a lactone-based compound, an alkyl ether-based compound, an alkyl acetate-based compound, and an alkyl propionate-based compound.

13. A lithium secondary battery comprising:
a positive electrode;
a negative electrode; and
a polymer electrolyte formed on at least one surface of the positive electrode and the negative electrode,
wherein the polymer electrolyte comprises the polymer electrolyte for a secondary battery of claim 2.

14. The lithium secondary battery of claim 13, further selectively comprising a porous olefin-based separator between the positive electrode and the negative electrode.

* * * * *